(12) United States Patent
Hsu (10) Patent No.: US 9,523,384 B2
(45) Date of Patent: Dec. 20, 2016

(54) PIVOT TRANSMISSION DEVICE

(71) Applicant: FIRST DOME CORPORATION, New Taipei (TW)

(72) Inventor: An Szu Hsu, New Taipei (TW)

(73) Assignee: First Dome Corporation, New Taipei (TW)

(*) Notice: Subject to any disclaimer, the term of this patent is extended or adjusted under 35 U.S.C. 154(b) by 60 days.

(21) Appl. No.: 14/696,589

(22) Filed: Apr. 27, 2015

(65) Prior Publication Data

US 2016/0230808 A1 Aug. 11, 2016

(30) Foreign Application Priority Data

Feb. 11, 2015 (TW) .............................. 104202247 U (51) Int. Cl.
*G06F 1/16* (2006.01)
*F16C 11/04* (2006.01)

(52) U.S. Cl.
CPC ............. *F16C 11/04* (2013.01); *G06F 1/1637* (2013.01); *Y10T 16/5323* (2015.01); *Y10T 16/5403* (2015.01); *Y10T 16/5409* (2015.01); *Y10T 16/54085* (2015.01); *Y10T 16/54095* (2015.01); *Y10T 16/540345* (2015.01)

(58) Field of Classification Search
CPC ........ G06F 1/1681; G06F 1/16; G06F 1/1616; G06F 1/1637; G06F 1/1601; G06F 1/1615; G06F 1/1626; G06F 1/1656; G06F 1/1684; H05K 5/0226; Y10T 29/49826; Y10T 74/1836; Y10T 16/5387; Y10T 16/540255; Y10T 16/54038; Y10T 16/547; Y10T 16/5403; Y10T 16/540345; Y10T 16/5323; Y10T 16/54085; Y10T 16/5409; Y10T 16/54095; F16C 11/04
USPC ......................... 361/679.21, 679.26, 679.27, 679.22,361/679.08, 679.09; 248/917–924; 455/575.1–575.4
See application file for complete search history.

(56) References Cited

U.S. PATENT DOCUMENTS

| 7,700,775 B2* | 4/2010 | Liao ..................... A61K 9/0053 544/169 |
| 9,003,607 B1* | 4/2015 | Hsu ........................ F16H 21/44 16/366 |

* cited by examiner

Primary Examiner — Anthony Haughton
Assistant Examiner — Ingrid Wright
(74) Attorney, Agent, or Firm — Rosenberg, Klein & Lee (57) ABSTRACT

A pivot transmission device is compact and can be assembled easily and conveniently, and includes a pivot, a base frame having a guide hole, an actuator disposed on the pivot and movable in response to turning of the base frame, and a transmission arm connected with the actuator and the base frame. When the actuator is turned and displaced, the transmission arm drives the guide hole of the base frame to move relative to the pivot for the base frame to depart from (or approach) the actuator, conforming to the operation mode of an electronic apparatus and lowering the obstruction of heat dissipation for the electronic apparatus.

36 Claims, 6 Drawing Sheets

PIVOT TRANSMISSION DEVICE

BACKGROUND OF THE INVENTION

1. Field of the Invention

The present invention relates to a pivot transmission device, and more particularly to a pivot transmission device cooperating with the turning of a base frame, rendering an actuator and a transmission arm to move on a pivot.

2. Description of the Prior Art

By applying a force, a pivotal axle or a turning axle mounted to an electronic apparatus (such as a cell phone, a notebook computer, a PDA, an electronic book, and the like) can be turned freely, such that the cover or display screen of the electronic apparatus can be turned to open or close. This is prior art, for example, U.S. Pat. No. 6,700,775 titled "portable electronic apparatus having a cover device with a stand unit for supporting a user interface device".

When this pivotal axle is applied to an electronic apparatus, a challenge for operation and structural design is that the display screen may block the heat dissipation hole disposed at the rear of the machine body module to influence the heat dissipation effect of the electronic apparatus. This may shorten the service life of the electronic apparatus. This situation is not expected.

A dual-shaft structure is developed accordingly. Two shafts are mounted on a display screen and a machine body module, respectively. When the display screen is opened, an interval is formed between the display screen and the machine body module. This embodiment can avoid the situation that the display screen blocks the heat dissipation hole of the machine body module. However, the components of the dual-shaft structure are more complicated, and it is more difficult to assemble and maintain the components, and the dual-shaft structure occupies larger space. This is not beneficial for the electronic apparatus to be thin and compact.

Typically, the aforesaid patents show the design of the pivotal axle and its related components. If the configuration of the pivotal axle and its related components can be changed to be different from the prior art, it can be used widely. For example, the pivotal axle cooperates with a transmission device to be applied to a notebook computer or a small-sized electronic apparatus for conforming to the condition of compact and thin design and improving the heat dissipation effect of the conventional electronic apparatus. Furthermore, the transmission device simultaneously brings a carrier, such that the carrier drives a frame of the electronic apparatus to ascend/descend for conforming to the operation mode of the electronic apparatus. The structure of the prior art is more complicated, increasing the difficulty of assembly and cost. The aforesaid patents don't teach or disclose these topics. Accordingly, the inventor of the present invention has devoted himself based on his many years of practical experiences to solve these problems.

SUMMARY OF THE INVENTION

The primary object of the present invention is to provide a pivot transmission device which is compact and can be assembled easily and conveniently. The pivot transmission device comprises a pivot, a base frame having a guide hole, an actuator disposed on the pivot and movable in response to turning of the base frame, and a transmission arm connected with the actuator and the base frame. When the actuator is turned and displaced, the transmission arm drives the guide hole of the base frame to move relative to the pivot for the base frame to depart from (or approach) the actuator. This conforms to the operation mode of an electronic apparatus and lowers the obstruction of heat dissipation for the electronic apparatus.

Preferably, the base frame is disposed on a display module of the electronic apparatus and turned along with the display module. The base frame includes a guide hole, cooperating with a driven unit, to be assembled on the pivot. The driven unit is turned along with the turning of the base frame. The pivot is provided with a tractive portion. The actuator is provided with a coupling portion corresponding to the tractive portion of the pivot. When the actuator brings a change of angle along with the turning of the base frame, the coupling portion of the actuator brings an axial displacement relative to the tractive portion of the pivot. The axial displacement makes the transmission arm drive the guide hole of the base frame to move along the pivot, such that the base frame brings the display module to depart from or approach the machine body module of the electronic apparatus.

Preferably, the actuator is connected with a carrier. The carrier is moved along with the movement of the actuator. The carrier is pivotally connected with a frame to bring the frame to ascend/descend as a support frame to support the electronic apparatus. This way can protect and prevent the keyboard disposed on the machine body module from being touched by accident, conforming to the operation mode of an electronic apparatus.

DETAILED DESCRIPTION OF THE PREFERRED EMBODIMENTS

Embodiments of the present invention will now be described, by way of example only, with reference to the accompanying drawings.

Figure 1:
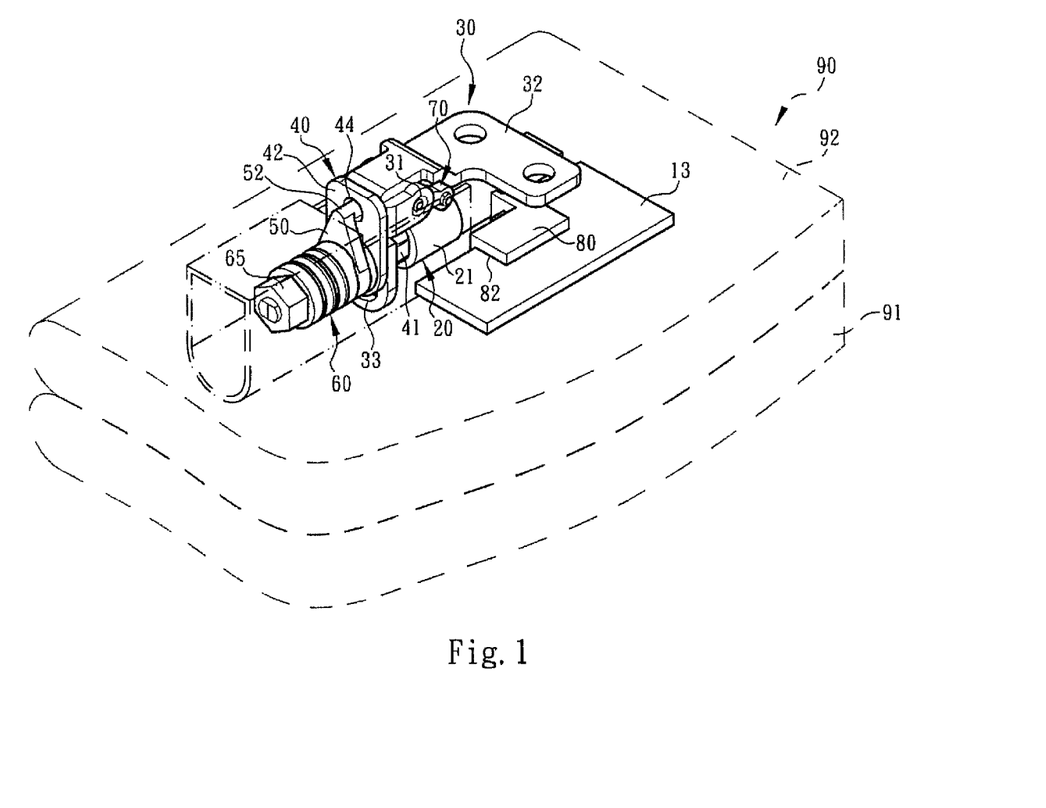
FIG. 1 is a perspective view according to a preferred embodiment of the present invention mounted to an electronic apparatus.
Figure 2:
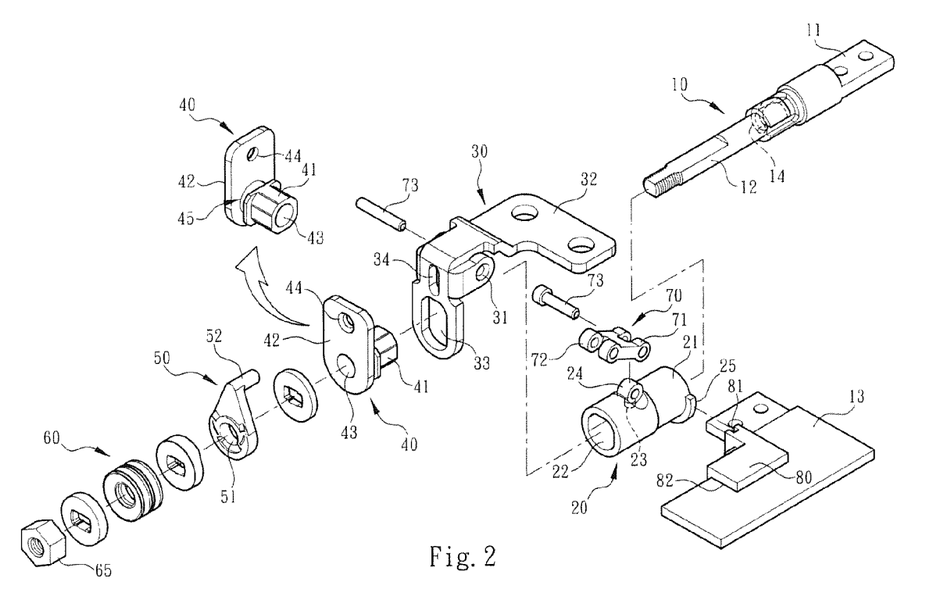
FIG. 2 is an exploded view according to the preferred embodiment of the present invention, showing the pivot, the base frame, the actuator, the transmission arm and the driven unit.
Figure 3:
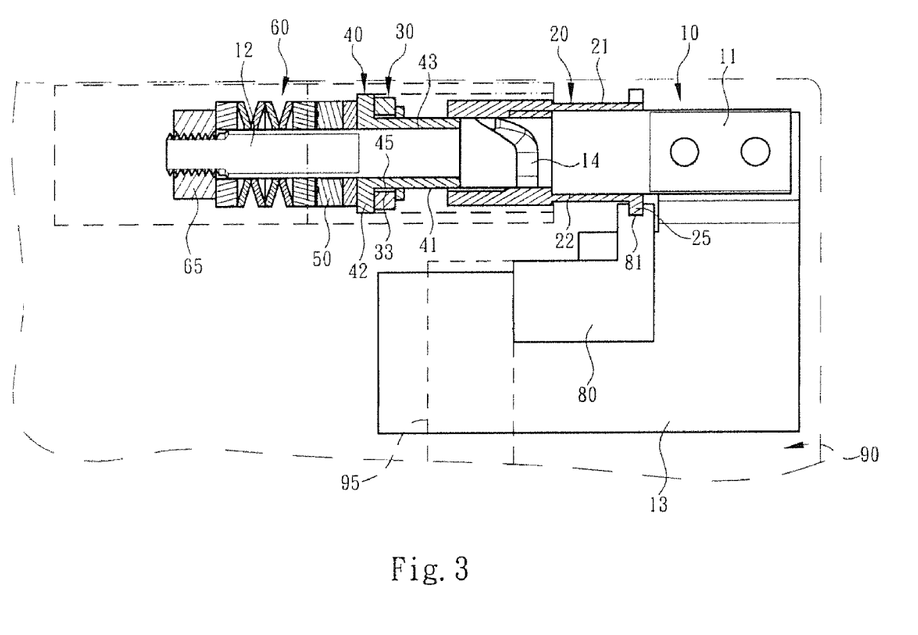
FIG. 3 is an assembled sectional view of FIG. 2, showing the pivot, the base frame, the actuator, the transmission arm and the driven unit.

Referring to FIG. 1, FIG. 2 and FIG. 3, the present invention discloses a pivot transmission device mounted to an electronic apparatus (such as a computer). The pivot transmission device comprises a pivot 10. The pivot 10 comprises an immovable section 11 and a pivotal section 12. The immovable section 11 is connected with a fixed plate 13 disposed on a machine body module 91 of the electronic apparatus 90. The pivotal section 12 is coupled with an actuator 20, a base frame 30, a driven unit 40, a secondary driven unit 50, and a torsion module 60, and locked by a fixing member 65. The torsion module 60 provides a positioning function when the force applied to the machine body module 91 or the display module 92 disappears.

In an embodiment, the surface of the pivot 10 is formed with a tractive portion 14. The tractive portion 14 is a spiral groove adapted to guide the actuator 20. The actuator 20 is a sleeve. The actuator 20 has a rigid wall 21 and a room 22 defined by the rigid wall 21. The pivotal section 12 is inserted through the room 22. The room 22 of the actuator 20 is provided with a coupling portion 23 corresponding to the tractive portion 14 of the pivot 10. The coupling portion 23 is a protrusion adapted to move in the tractive portion 14. It is understood that the spiral groove of the tractive portion 14 and the protrusion of the coupling portion 23 can be changed each other.

As shown in FIG. 2 and FIG. 3, the rigid wall 21 of the actuator 20 has a pivotal portion 24. The pivotal portion 24 is pivotally connected with a transmission arm 70.

Furthermore, the transmission arm 70 is a connecting rod. The transmission arm 70 has two ends 71, 72 pivotally connected with the pivotal portion 24 of the actuator 20 and a bolt hole 31 of the base frame 30 by means of bolts 73. The base frame 30 is connected with a plate 32 for the base frame 30 to be disposed on the display module 92 of the electronic apparatus 90 and driven along with the display module 92. Therefore, when the actuator 20 is turned along with the turning of the base frame 30, the actuator 20 (the coupling portion 23) will bring an axial displacement relative to the pivot 10 (the tractive portion 14). The actuator 20 further comprises a connecting portion 25 formed on the rigid wall 21. The connecting portion 25 is a shoulder-like configuration connected with a carrier 80, such that the carrier 80 is moved along with the movement of the actuator 20.

As shown in the drawings, the carrier 80 includes a first joint portion 81 having a U-shaped cross-section for connecting with the connecting portion 25 of the actuator 20. The carrier 80 further includes a second joint portion 82 having a U-shaped cross-section for connecting with the fixed plate 13, such that the carrier 80 is moved on the fixed plate 13 along with the movement of the actuator 20.

In a prefer embodiment, the base frame 30 comprises a rectangle-like guide hole 33 and a secondary guide hole 34. The guide hole 33 is for the pivotal section 12 of the pivot 10 to pass therethrough. The guide hole 33 is selective to cooperate with the driven unit 40 to be assembled on the pivotal section 12 of the pivot 10.

The configuration that the guide hole 33 cooperates with the driven unit 40 to be assembled to the pivot 10 is beneficial to stabilize the movement of the base frame 30. The axial displacement of the actuator 20 makes the transmission arm 70 drive the guide hole 33 of the base frame 20 to move up and down along the pivot 10, such that the base frame 30 brings the display module 92 to depart from or approach the machine body module 91 of the electronic apparatus 90.

Figure 4:
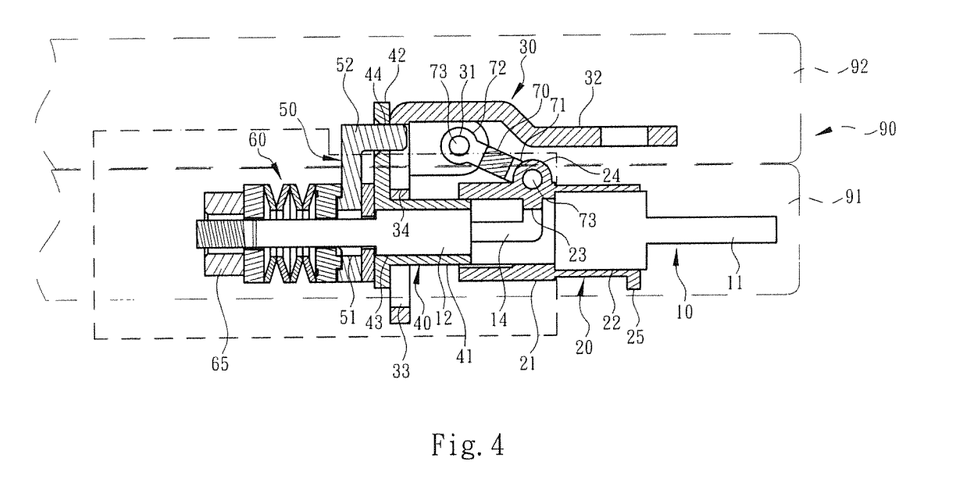
FIG. 4 is an assembled sectional view of FIG. 2 seen from another angle, showing the actuator, the transmission arm, and the base frame.

Referring to FIG. 2 and FIG. 4, the driven unit 40 comprises a protruding portion 41 having a geometric cross-section and a plate portion 42 perpendicular to the protruding portion 41. The protruding portion 41 has a neck 45 located between the protruding portion 41 and the plate portion 42. The protruding portion 41 or the neck 45 is assembled to the guide hole 33 of the base frame 30, such that the driven unit 40 is turned along with the turning of the base frame 30 and moved on the guide hole 33. The driven unit 40 further has a first pivot hole 43 formed on the protruding portion 41, the plate portion 42 and the neck 35 for the driven unit 40 to be fitted on the pivotal section 12 of the pivot 10. The plate portion 42 has a connecting hole 44 for connecting with the secondary driven unit 50.

As shown in the drawings, the secondary driven unit 50 includes a second pivot hole 51 to fit on the pivotal section 12 of the pivot 10. The secondary driven unit 50 includes a protruding post 52 which is perpendicular to the secondary driven unit 50 and inserted through the connecting hole 44 of the driven unit 40 and the secondary guide hole 34 of the base frame 30. When the base frame 30 is turned, the secondary driven unit 50 is turned accordingly and the secondary guide hole 34 is moved up and down relative to the post 52.

Referring to FIG. 3 and FIG. 4, the display module 92 is closed relative to the machine body module 91. At this time, the protruding portion 41 or the neck 45 of the driven unit 40 is located at the upper position (or defined as the first position) of the guide hole 33, as shown in FIG. 4. The post 52 of the secondary driven unit 50 is located at the upper position (or defined as the first position) of the secondary guide hole 34, as shown in FIG. 4.

Figure 5:
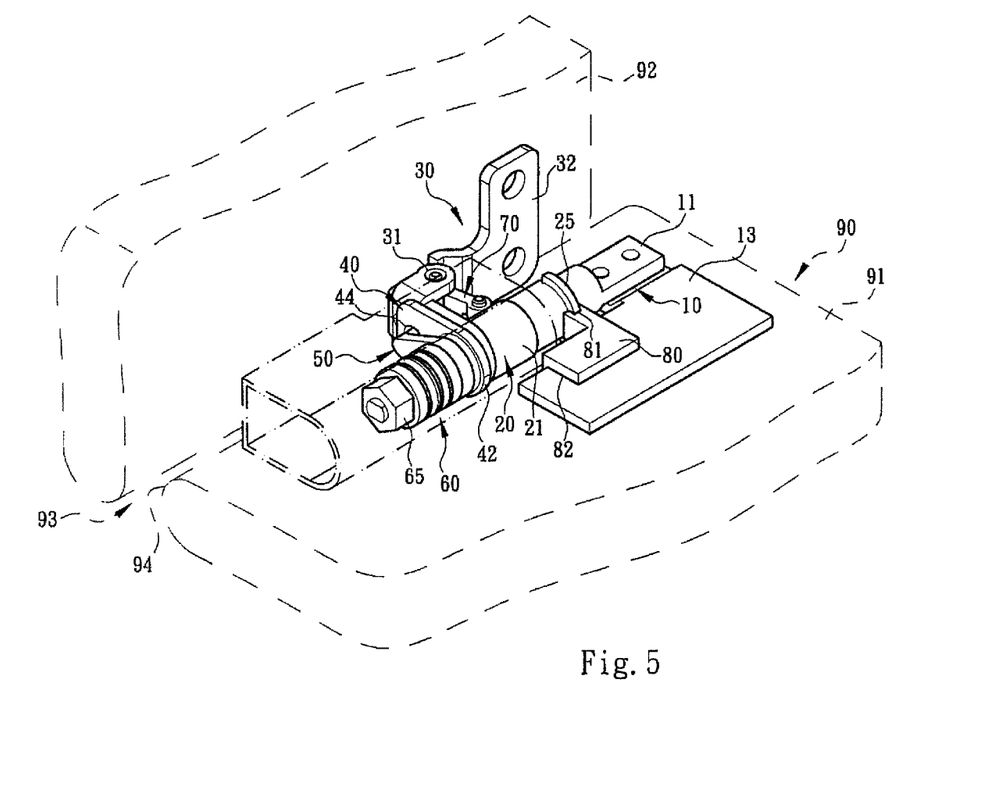
FIG. 5 is a schematic view according to the preferred embodiment of the present invention, showing the configuration when the display module is opened about 90 degrees.

Referring to FIG. 4 and FIG. 5, when the display module 92 is opened by the user, the display module 92 brings the base frame 30, the driven unit 40, and the secondary driven unit 50 to turn. The turning of the base frame 30 drives the actuator 20 to turn through the transmission arm 70 to bring a change of angle. Therefore, the coupling portion 23 of the actuator 20 is moved along the tractive portion 14 of the pivot 10, so that the actuator 20 brings an axial displacement on the pivot 10 (or is moved in the left direction of FIG. 4 or FIG. 6).

Figure 6:
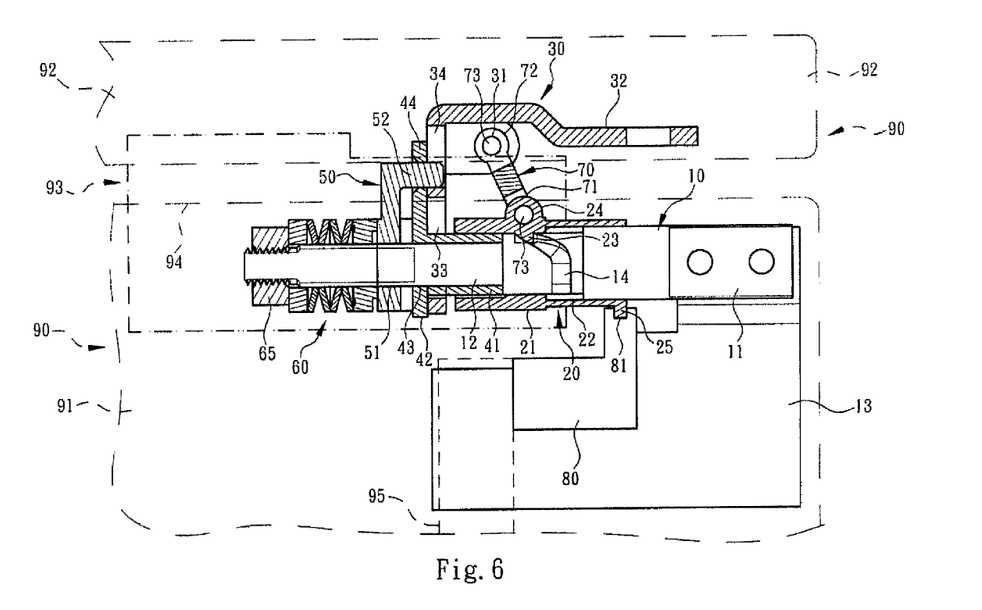
FIG. 6 is a sectional view of FIG. 5, showing the movement of the actuator, the transmission arm, the base frame, and the carrier.

Referring to FIG. 6, when the actuator 20 brings an axial displacement, the transmission arm 70 is forced to push the base frame 30 and the display module 92 to move upward, such that the display module 92 departs from the machine body module 91 or an interval 93 is formed between the display module 92 and the machine body module 91. The interval 93 is adapted to prevent the display module 92 from blocking a heat dissipation system or a heat dissipation hole (not shown in the drawings) at the rear 94 of the machine body module 91.

As shown in FIG. 6, when the transmission arm 70 pushes the base frame 30 and the display module 92 to move upward, the protruding portion 41 or the neck 45 of the driven unit 40 is moved to the lower portion (or defined as the second position) of the guide hole 33 accordingly, and the post 52 of the secondary driven unit 50 is also moved to the lower position (or defined as the second position) of the secondary guide hole 34.

FIG. 6 also shows that the actuator 20 brings the carrier 80 to move from the right to the left of the drawing. The carrier 80 drives or pushes a frame 95 disposed on the machine body module 91 to move or ascend/descend. When the frame 95 is moved the highest position, it is higher than the keyboard (not shown in the drawings) as a support frame to support the electronic apparatus 90. This can protect and prevent the keyboard disposed on the machine body module 91 from being touched by accident, conforming to the operation mode of an electronic apparatus.

It is understood that when the display module 92 is closed relative to the machine body module 91 by the user, the actuator 20, the base frame 30, the driven unit 40, the secondary driven unit 50, the carrier 80, and the frame 95 will be brought to the original positions.

Typically, the pivot transmission device of the present invention is compact and thin. Compared to the prior art, the present invention has the following advantages:

1. The pivot 10, the transmission device and the related components are designed to be different from the prior art. Their use and operation have been changed. For example, the pivot 10 is provided with the tractive portion 14 to cooperate with the coupling portion 23 of the actuator 20. The transmission arm 70 is pivotally connected between the actuator 20 and the base frame 30, rendering the transmission arm 70 to push the base frame 30 to move. The base frame 30 is provided with the guide hole 33 for connecting with the protruding portion 41 of the driven unit 40, such that the actuator 20 brings the carrier 80 and the frame 95 to move. Substantially, the present invention overcomes the problems of the prior art that has a complicated structure to increase the difficulty of assembly and cost.

2. Typically, the design of the coupling portion 23 of the actuator 20 and the tractive portion 14 of the pivot 10 to cooperate with the base frame 30 and the transmission arm 70 makes the actuator 20 have a change of angle in response to the turning of the base frame 30 and a displacement on the pivot 10 so as to drive the base frame 30 or the display module 92 to depart from or approach the machine body module 91. This improves the heat dissipation effect of the electronic apparatus. Furthermore, the actuator 20 simultaneously brings the carrier 80 for the carrier 80 to drive the frame 95 of the electronic apparatus 90 to ascend/descend.

The prevent invention provides an efficient pivot transmission device. Its space configuration is different from that of the prior art, and is a great improvement.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pivot transmission device, comprising:
   a pivot having an immovable section and a pivotal section, the pivotal section having a tractive portion;
   a base frame having a guide hole for the pivotal section to pass therethrough;
   an actuator disposed on the pivot and movable in response to turning of the base frame, the actuator having a coupling portion corresponding to the tractive portion of the pivot to be moved relative to the tractive portion; and
   a transmission arm connected with the actuator and the base frame, wherein when the actuator is turned and displaced, the transmission arm drives the guide hole of the base frame to move relative to the pivot.

2. The pivot transmission device as claimed in claim 1, wherein the immovable section of the pivot is disposed on a machine body module of an electronic apparatus, the base frame being connected with a plate disposed on a display module of the electronic apparatus for the base frame to be turned along with the display module, the pivotal section of the pivot being provided with a torsion module and locked by a fixing member, wherein when the actuator is displaced, the transmission arm drives the guide hole of the base frame to displace along the pivot.

3. The pivot transmission device as claimed in claim 2, wherein a surface of the pivot is formed with the tractive portion, the tractive portion being a spiral groove, the actuator being a sleeve, the actuator having a rigid wall and a room defined by the rigid wall, the pivotal section being inserted through the room, the coupling portion being disposed on the room of the actuator, the coupling portion being a protrusion movable in the tractive portion.

4. The pivot transmission device as claimed in claim 3, wherein the actuator has a pivotal portion, the pivotal portion being pivotally connected with the transmission arm, the transmission arm being a connecting rod, the transmission arm having two ends pivotally connected with the pivotal portion of the actuator and a bolt hole of the base frame by means of bolts, wherein when the actuator is turned along with the turning of the base frame, the actuator brings an axial displacement relative to the pivot, the actuator further comprising a connecting portion, the connecting portion being connected with a carrier, the carrier being moved along with movement of the actuator.

5. The pivot transmission device as claimed in claim 4, wherein the connecting portion of the actuator is a shoulder configuration, the carrier including a first joint portion having a U-shaped cross-section for connecting with the connecting portion of the actuator, the carrier further including a second joint portion having a U-shaped cross-section for connecting with a fixed plate, the carrier being moved on the fixed plate along with the movement of the actuator, the fixed plate being coupled to the immovable section of the pivot, the carrier driving a frame.

6. The pivot transmission device as claimed in claim 5, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

7. The pivot transmission device as claimed in claim 6, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

8. The pivot transmission device as claimed in claim 4, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

9. The pivot transmission device as claimed in claim 8, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

10. The pivot transmission device as claimed in claim 2, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

11. The pivot transmission device as claimed in claim 10, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

12. The pivot transmission device as claimed in claim 3, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

13. The pivot transmission device as claimed in claim 12, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

14. The pivot transmission device as claimed in claim 2, wherein the actuator has a pivotal portion, the pivotal portion being pivotally connected with the transmission arm, the transmission arm being a connecting rod, the transmission arm having two ends pivotally connected with the pivotal portion of the actuator and a bolt hole of the base frame by means of bolts, wherein when the actuator is turned along with the turning of the base frame, the actuator brings an axial displacement relative to the pivot, the actuator further comprising a connecting portion, the connecting portion being connected with a carrier, the carrier being moved along with movement of the actuator.

15. The pivot transmission device as claimed in claim 14, wherein the connecting portion of the actuator is a shoulder configuration, the carrier including a first joint portion having a U-shaped cross-section for connecting with the connecting portion of the actuator, the carrier further including a second joint portion having a U-shaped cross-section for connecting with a fixed plate, the carrier being moved on the fixed plate along with the movement of the actuator, the fixed plate being coupled to the immovable section of the pivot, the carrier driving a frame.

16. The pivot transmission device as claimed in claim 15, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

17. The pivot transmission device as claimed in claim 16, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

18. The pivot transmission device as claimed in claim 14, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

19. The pivot transmission device as claimed in claim 18, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

20. The pivot transmission device as claimed in claim 1, wherein a surface of the pivot is formed with the tractive portion, the tractive portion being a spiral groove, the actuator being a sleeve, the actuator having a rigid wall and a room defined by the rigid wall, the pivotal section being inserted through the room, the coupling portion being disposed on the room of the actuator, the coupling portion being a protrusion movable in the tractive portion.

21. The pivot transmission device as claimed in claim 20, wherein the actuator has a pivotal portion, the pivotal portion being pivotally connected with the transmission arm, the transmission arm being a connecting rod, the transmission arm having two ends pivotally connected with the pivotal portion of the actuator and a bolt hole of the base frame by means of bolts, wherein when the actuator is turned along with the turning of the base frame, the actuator brings an axial displacement relative to the pivot, the actuator further comprising a connecting portion, the connecting portion being connected with a carrier, the carrier being moved along with movement of the actuator.

22. The pivot transmission device as claimed in claim 21, wherein the connecting portion of the actuator is a shoulder configuration, the carrier including a first joint portion having a U-shaped cross-section for connecting with the connecting portion of the actuator, the carrier further including a second joint portion having a U-shaped cross-section for connecting with a fixed plate, the carrier being moved on the fixed plate along with the movement of the actuator, the fixed plate being coupled to the immovable section of the pivot, the carrier driving a frame.

23. The pivot transmission device as claimed in claim 22, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

24. The pivot transmission device as claimed in claim 23, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

25. The pivot transmission device as claimed in claim 21, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

26. The pivot transmission device as claimed in claim 25, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

27. The pivot transmission device as claimed in claim 20, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

28. The pivot transmission device as claimed in claim 27, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

29. The pivot transmission device as claimed in claim 1, wherein the actuator has a pivotal portion, the pivotal portion being pivotally connected with the transmission arm, the transmission arm being a connecting rod, the transmission arm having two ends pivotally connected with the pivotal portion of the actuator and a bolt hole of the base frame by means of bolts, wherein when the actuator is turned along with the turning of the base frame, the actuator brings an axial displacement relative to the pivot, the actuator further comprising a connecting portion, the connecting portion being connected with a carrier, the carrier being moved along with movement of the actuator.

30. The pivot transmission device as claimed in claim 29, wherein the connecting portion of the actuator is a shoulder configuration, the carrier including a first joint portion having a U-shaped cross-section for connecting with the connecting portion of the actuator, the carrier further including a second joint portion having a U-shaped cross-section for connecting with a fixed plate, the carrier being moved on the fixed plate along with the movement of the actuator, the fixed plate being coupled to the immovable section of the pivot, the carrier driving a frame.

31. The pivot transmission device as claimed in claim 30, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

32. The pivot transmission device as claimed in claim 31, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

33. The pivot transmission device as claimed in claim 29, wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

34. The pivot transmission device as claimed in claim 33, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

35. The pivot transmission device as claimed in claim 1 wherein the guide hole of the base frame has a rectangle shape, the guide hole being coupled with a driven unit, the driven unit having a first pivot hole to be fitted on the pivotal section of the pivot, the driven unit comprising a protruding portion having a geometric cross-section and a plate portion perpendicular to the protruding portion, the protruding portion being assembled to the guide hole of the base frame, the driven unit being turned along with the turning of the base frame and moved relative to the guide hole, the first pivot hole of the driven unit being formed on the protruding portion and the plate portion for the driven unit to be fitted on the pivotal section of the pivot.

36. The pivot transmission device as claimed in claim 35, wherein the protruding portion of the driven unit has a neck located between the protruding portion and the plate portion, the protruding portion being assembled to the guide hole of the base frame through the neck, the plate portion having a connecting hole for connecting with a secondary driven unit, the secondary driven unit including a second pivot hole to fit on the pivotal section of the pivot, the secondary driven unit including a protruding post which is perpendicular to the secondary driven unit and inserted through the connecting hole of the driven unit and the secondary guide hole of the base frame, the secondary driven unit being turned along with the turning of the base frame, rendering the protruding post to be moved relative to the secondary guide hole.

\* \* \* \* \*